(12) United States Patent
Daiss et al.

(10) Patent No.: US 10,150,091 B2
(45) Date of Patent: Dec. 11, 2018

(54) APPARATUS FOR ADDITION OF DROPLETS OF A MONOMER SOLUTION TO A REACTOR

(71) Applicant: BASF SE, Ludwigshafen (DE)

(72) Inventors: Andreas Daiss, Ludwigshafen (DE); Robert Bayer, Sinsheim (DE); Rudolf Schliwa, Alzenau (DE); Jürgen Freiberg, Lampertheim (DE); Karl J. Possemiers, 's Gravenwezel (BE); Marco Krüger, Mannheim (DE)

(73) Assignee: BASF SE, Ludwigshafen (DE)

( * ) Notice: Subject to any disclaimer, the term of this patent is extended or adjusted under 35 U.S.C. 154(b) by 13 days.

(21) Appl. No.: 15/320,776

(22) PCT Filed: Jun. 16, 2015

(86) PCT No.: PCT/EP2015/063430
§ 371 (c)(1),
(2) Date: Dec. 21, 2016

(87) PCT Pub. No.: WO2015/197425
PCT Pub. Date: Dec. 30, 2015

(65) Prior Publication Data
US 2017/0225138 A1 Aug. 10, 2017

(30) Foreign Application Priority Data
Jun. 23, 2014 (EP) .................................... 14173491

(51) Int. Cl.
*B01J 4/00* (2006.01)
*C08F 120/14* (2006.01)

(52) U.S. Cl.
CPC ............. *B01J 4/001* (2013.01); *C08F 120/14* (2013.01); *B01J 2204/002* (2013.01)

(58) Field of Classification Search
CPC .......... B01J 4/00; B01J 4/001; B01J 2204/00; B01J 2204/002; C08F 120/00; C08F 120/02; C08F 120/10–120/14
See application file for complete search history.

(56) References Cited

U.S. PATENT DOCUMENTS

| 4,839,108 A | 6/1989 | Silvey |
|---|---|---|
| 5,014,740 A | 5/1991 | Cameron |

(Continued)

FOREIGN PATENT DOCUMENTS

| EP | 1 500 418 A1 | 1/2005 |
|---|---|---|
| WO | WO-200/6079631 A1 | 8/2006 |

(Continued)

OTHER PUBLICATIONS

International Search Report in PCT Patent Application No. PCT/EP2015/063430, dated Aug. 31, 2015.

*Primary Examiner* — Natasha E Young
(74) *Attorney, Agent, or Firm* — Marshall Gerstein & Borun LLP (57) ABSTRACT

An apparatus for addition of droplets of a monomer solution for production of poly(meth)acrylate to a reactor for droplet polymerization, comprising at least one channel or a dropletizer head having, at its base, holes through which the solution is dropletized into the reactor, at least one of the following features being fulfilled:
  (a) the ratio of the area covered by the channels or the dropletizer head in the reactor relative to the area which is defined by the circumference of a line along the outermost holes is less than 50%,
  (b) the number of holes relative to the area which is defined by the circumference of a line along the outermost holes is within a range from 100 to 1000 holes/m$^2$.

10 Claims, 5 Drawing Sheets

(56) References Cited

U.S. PATENT DOCUMENTS

| | | |
|---|---|---|
| 7,727,586 B2 | 6/2010 | Bruhns et al. |
| 2008/0242817 A1 | 10/2008 | Ducker et al. |
| 2009/0315204 A1 | 12/2009 | Losch et al. |
| 2010/0010176 A1 | 1/2010 | Losch et al. |
| 2011/0111231 A1 | 5/2011 | Kruger et al. |
| 2011/0238026 A1* | 9/2011 | Zhang .................. A61F 13/534 604/372 |

FOREIGN PATENT DOCUMENTS

| | | |
|---|---|---|
| WO | WO-2007/031441 A2 | 3/2007 |
| WO | WO-2008/040715 A2 | 4/2008 |
| WO | WO-2008/086976 A1 | 7/2008 |
| WO | WO-2008/105669 A1 | 9/2008 |
| WO | WO-2010/003855 A2 | 1/2010 |
| WO | WO-2011/026876 A1 | 3/2011 |

* cited by examiner

FIG.9

APPARATUS FOR ADDITION OF DROPLETS OF A MONOMER SOLUTION TO A REACTOR

CROSS-REFERENCE TO RELATED APPLICATIONS

This is the U.S. national phase of International Patent Application No. PCT/EP2015/063430, now WO 2015/197425, filed Jun. 16, 2015, which claims the benefit of European Patent Application No. 14173491.3, filed Jun. 23, 2014.

The invention proceeds from an apparatus for addition of droplets of a monomer solution for production of poly(meth)acrylate to a reactor for droplet polymerization, comprising at least one channel or a dropletizer head having, at its base, holes through which the solution is introduced into the reactor.

Poly(meth)acrylates find use especially as water-absorbing polymers which are used, for example, in the production of diapers, tampons, sanitary napkins and other hygiene articles, or else as water-retaining agents in market gardening.

The properties of the water-absorbing polymers can be adjusted via the level of crosslinking. With increasing level of crosslinking, there is a rise in gel strength and a fall in absorption capacity. This means that centrifuge retention capacity decreases with rising absorption under pressure, and the absorption under pressure also decreases again at very high levels of crosslinking.

To improve the performance properties, for example liquid conductivity in the diaper and absorption under pressure, water-absorbing polymer particles are generally postcrosslinked. This only increases the level of crosslinking at the particle surface, and in this way it is possible to at least partly decouple absorption under pressure and centrifuge retention capacity. This postcrosslinking can be performed in aqueous gel phase. In general, however, ground and sieved polymer particles are surface coated with a postcrosslinker, thermally postcrosslinked and dried. Crosslinkers suitable for this purpose are compounds which comprise at least two groups which can form covalent bonds with the carboxylate groups of the hydrophilic polymer.

Different processes are known for production of the water-absorbing polymer particles. For example, the monomers and any additives used for production of poly(meth)acrylates can be added to a mixing kneader, in which the monomers react to give the polymer. Rotating shafts with kneading bars in the mixing kneader break up the polymer formed into chunks. The polymer withdrawn from the kneader is dried and ground and sent to further processing. In an alternative variant, the monomer is introduced in the form of a monomer solution which may also comprise further additives into a reactor for droplet polymerization. On introduction of the monomer solution into the reactor, it breaks down into droplets. The mechanism of droplet formation may be turbulent or laminar jet disintegration, or else dropletization. The mechanism of droplet formation depends on the entry conditions and the physical properties of the monomer solution. The droplets fall downward in the reactor, in the course of which the monomer reacts to give the polymer. In the lower region of the reactor is a fluidized bed into which the polymer particles formed from the droplets by the reaction fall. Further reaction then takes place in the fluidized bed. Corresponding processes are described, for example, in WO-A 2006/079631, WO-A 2008/086976, WO-A 2007/031441, WO-A 2008/040715, WO-A 2010/003855 and WO-A 2011/026876.

A disadvantage of all the processes that are conducted by the principle of droplet polymerization, in which monomer solution disintegrates into droplets and falls downward in a reactor to form the polymer, is that droplets can coalesce on collision, and droplets hitting the wall of the reactor can also stick and thus lead to unwanted formation of deposits. A further disadvantage is that the droplets do not mix homogeneously with the gas in the reactor. This gives rise to unequal droplet temperatures and, as a result, to unequal drying and polymerization conditions for the droplets, which has an adverse effect on the properties of the end product.

It is an object of the present invention to provide an apparatus for addition of droplets of a monomer solution for production of poly(meth)acrylate in a reactor for droplet polymerization, with which homogeneous distribution of the droplets over the reactor cross section becomes possible, and which also ensures that the droplets do not coalesce and a minimum level of wall deposits arises through premature contact of the droplets with the reactor wall.

This object is achieved by an apparatus for addition of droplets of a monomer solution for production of poly(meth)acrylate to a reactor for droplet polymerization, comprising at least one channel or a dropletizer head having, at its base, holes through which the solution is introduced into the reactor, at least one of the following features being fulfilled:
(a) the ratio of the area covered by the channels or the dropletizer head in the reactor relative to the area which is defined by the surface within a circumferential line of the channels or the dropletizer head which connects the outermost holes is less than 50%,
(b) the number of holes relative to the area which is defined by the surface within a circumferential line of the channels or the dropletizer head which connects the outermost holes is within the range from 100 to 1000 holes/m$^2$.

By virtue of the configuration such that the ratio of the area covered by the channels or the dropletizer head in the reactor relative to the area which is defined by the surface within a circumferential line of the channels or the dropletizer head which connects the outermost holes is less than 50%, it is possible for a sufficient amount of gas which is supplied to the reactor above the apparatus for addition of droplets to flow past the apparatus into the reactor such that a homogeneous gas velocity in the reactor can be achieved and, more particularly, for there to be no excessive acceleration and vortexing of the gas as it flows around the apparatus, which could lead to unwanted deflection of the droplets and, as a result, to collision and coalescence in the region of the apparatus for dropletization. It is preferable when the ratio of the area covered by the channels or the dropletizer head in the reactor relative to the area which is enclosed by the line connecting the outermost holes is in the range between 3% and 30%.

By virtue of the execution such that the number of holes relative to the area which is formed by the line connecting the outermost holes is in the range from 100 to 1000 holes/m$^2$, it is ensured that the droplets formed in the holes have a sufficiently large distance from one another and can additionally come into sufficient contact with the gas flowing through the reactor. Preferably, the number of holes relative to the area which is formed by the line connecting the outermost holes is in the range from 150 to 800 holes/m$^2$ and especially in the range from 200 to 500 holes/m$^2$.

For a simple revision of the apparatus for dropletization of the monomer solution, it is preferable when the at least one channel is connected at its base to at least one dismantleable dropletizer plate in which the holes for addition of the monomer solution are formed. This firstly enables variation in the size of the holes through exchange of the dropletizer plates in a simple manner as a function of the monomer solution or the desired droplet size; secondly, it is also possible to exchange the dropletizer plates in a simple manner, in order, for example, to clean used dropletizer plates when they are soiled.

Typically, the monomer solution exits from the holes of the apparatus for dropletization in the form of a liquid jet which then disintegrates into droplets in the reactor. The disintegration of the liquid jet depends firstly on the amount of the liquid which exits through the holes per unit time, and secondly on the velocity and the volume of the gas flowing through the reactor. In addition, the physical properties of the monomer solution and the geometry of the holes affect the way in which the jet disintegrates. In the context of present invention, droplet disintegration is also referred to as dropletization.

In one embodiment, the channels with the holes formed in the base thereof are arranged in a star shape in the reactor head. The star-shaped arrangement of the channels, especially in a reactor with circular cross section, enables homogeneous distribution of the droplets in the reactor. The addition is effected through the channels into which the monomer solution is introduced. The liquid exits through the holes at the base of the channels and forms the droplets.

In order that the droplets exiting from the channels come into contact as quickly as possible with the gas flowing around the channels, it is additionally preferable when the channels have a minimum width. The width of the channels is preferably in the range from 25 to 500 mm, further preferably in the range from 100 to 400 mm and especially in the range from 150 to 350 mm.

The number $N_{RL}$ of individual channels in the case of a star-shaped arrangement is dependent on the circumference C of the reactor at the position where the channels are arranged. Preferably, the number of channels is within the range defined below:

$$\frac{C}{4.0 \text{ m}} \leq N_{RL} \leq \frac{C}{1.2 \text{ m}}$$

and especially $$\frac{C}{3.6 \text{ m}} \leq N_{RL} \leq \frac{C}{1.8 \text{ m}}.$$

In these formulae, the circumference C should be used in meters and "m" means meters.

In addition to a configuration such that the channels of the apparatus for dropletization are arranged in a star shape, they may also be arranged in any desired arrangement with respect to one another, for example parallel to one another or overlapping one another, such that, for example, a rectangular pitch or a triangular pitch is achieved by the arrangement of the channels. In the case of a triangular pitch and a rectangular pitch, a plurality of channels aligned in parallel are aligned transverse to one another in each case, the angle between the channels aligned transverse to one another being 90° in the case of a rectangular pitch and preferably 60° in the case of a triangular pitch.

As an alternative to the star-shaped arrangement in which all the channels meet in the center of the reactor, it is alternatively also possible to arrange the channels in a rotationally symmetric manner about the center of the reactor, in which case the channels each project into the reactor from the outer wall to different degrees in the direction of the center of the reactor. This is advantageous especially in the case of high reactor diameters, since this arrangement allows more channels on the outside than in the middle of the reactor and, as a result, more homogeneous supply of the monomer solution over the overall reactor cross section.

In a further embodiment, the apparatus for addition of droplets comprises at least one annular channel. This annular channel is preferably configured such that it runs parallel to the inner wall of the reactor and the distance between the inner wall and the channel is the same over the entire circumference. For a homogeneous distribution of the droplets, it is also preferable when the diameter of the outermost annular channel is 10% to 35% less than the maximum internal diameter of the reactor.

If the monomer solution is added using a dropletizer head rather than at least one channel, this dropletizer head preferably has a circular or homogeneous polygonal cross section. The circular or homogeneous polygonal cross section likewise achieves the effect of homogeneous distribution of the droplets in the reactor. A dropletizer head can be used, for example, when the reactor likewise has a circular cross section. In the case of a noncircular cross section of the reactor, when dropletizer heads are used, a homogeneous droplet distribution can be achieved, for example, through use of a plurality of dropletizer heads.

As well as the use of at least one channel or a dropletizer head for addition of the monomer solution, it is also possible to use at least one channel and one dropletizer head. For example, it is possible to use a dropletizer head and an annular channel that surrounds the dropletizer head. It is also possible, in addition to the dropletizer head, to provide radially aligned channels projecting from the outside inward.

In order to obtain droplets of a suitable size for water-absorbing polymers, it is preferable when the holes through which the monomer solution is added have a diameter in the range from 25 to 500 μm, more preferably in the range from 50 to 350 μm and especially in the range from 100 to 250 μm. The holes in the dropletizer plate may be manufactured in conical form, in cylindrical form, or with a conical and a cylindrical section. In the case of manufacture with a conical and a cylindrical section, the conical section is on the side facing the channel, in which case the diameter decreases from an upper diameter toward the cylindrical section. The cylindrical section that follows then has the above-defined diameter.

In order to produce a sufficiently large number of droplets, it is preferable when the holes in the dropletizer plates are arranged in several rows of holes. It is especially preferable here when the distance between the individual holes in a row of holes and the distance between adjacent rows of holes are essentially the same. A suitable distance between the holes in a row of holes and of the rows of holes from one another is in the range from 1 to 100 mm, preferably in the range from 2 to 50 mm and especially in the range from 3 to 20 mm.

In order to be able to introduce a sufficiently large amount of monomer solution into the reactor, it is also advantageous when the number of holes based on the area of the dropletizers is in the range from 1000 to 15 000 holes/m², preferably in the range from 2000 to 12 000 holes/m² and especially in the range from 4000 to 10 000 holes/m².

It is additionally preferable when at least the holes at the edge of the channel are formed in such a way that the monomer solution exits from the holes at an angle relative to the axis of the reactor. Through the exit of the monomer solution at an angle relative to the axis of the reactor, it is possible to obtain a more homogeneous distribution of the droplets in the reactor and a greater separation of the droplets from a channel from one another. In the case of a star-shaped arrangement of the channels, it is additionally preferable when the angle at which the monomer solution exits from the holes relative to the axis of the reactor increases from the inside outward. The exiting of the liquid at an angle relative to the axis of the reactor can be achieved either through appropriate configuration of the holes, for example by virtue of them being formed at an angle in the dropletizer plate, or alternatively through angled configuration of the dropletizer plate.

If the angle at which the droplets exit from the holes is constant over the entire length of the individual channels of the apparatus for dropletization, it is preferably in the range from 0 to 30°, preferably in the range from 0.1 to 20° and especially in the range from 0.2 to 15°.

Especially in the case of a star-shaped arrangement of the channels, it is preferable when the angle at which the droplets exit from the holes varies with the position of the hole, since the distance between two channels increases from the middle outward. Thus, it is advantageous when the angle closer to the middle is smaller than the angle at the outer holes.

In the case of a star-shaped arrangement, it is preferable when the angle α at which the liquid exits at least from the holes at the radial edges is within the range defined below:

$$\frac{r}{N_{LR} \cdot d_P \cdot v^{0.578}} \cdot (0.00697 \cdot r + 0.0332) - 6.296 \leq$$

$$\alpha \leq \frac{r}{N_{LR} \cdot d_P \cdot v^{0.578}} \cdot (0.00697 \cdot r + 0.0332) + 4.704,$$

preferably $$\frac{r}{N_{LR} \cdot d_P \cdot v^{0.578}} \cdot (0.00697 \cdot r + 0.0332) - 4.296 \leq$$

$$\alpha \leq \frac{r}{N_{LR} \cdot d_P \cdot v^{0.578}} \cdot (0.00697 \cdot r + 0.0332) + 2.704$$

and more preferably $$\frac{r}{N_{LR} \cdot d_p \cdot v^{0.578}} \cdot (0.00697 \cdot r + 0.0332) - 2.296 \leq$$

$$\alpha \leq \frac{r}{N_{LR} \cdot d_p \cdot v^{0.578}} \cdot (0.00697 \cdot r + 0.0332) + 1.704,$$

for the range of validity $$0.25 \text{ m} \leq r \leq 10 \text{ m}$$

$$0.0001 \text{ m} \leq d_p \leq 0.0015 \text{ m}$$

$$3 \frac{m}{s} \leq v \leq 30 \frac{m}{s}$$

$$3 \leq N_{LR} \leq 18.$$

In these formulae, r is the radial position of the hole in meters, $N_{LR}$ is the number of channels, $d_p$ is the mean droplet diameter in meters and v is the droplet exit velocity in meters per second. The angle α of the holes is found in degrees. If a value less than zero is found, the value of 0° should be used for the angle in place of the value calculated.

The exit angle of the droplets relative to the axis of the reactor can be optimized further by numerical simulation calculations. As well as a constant change in the exit angle, it is alternatively also possible to change the exit angle of the droplets stepwise. For this purpose, in that case, the angle in the middle of each stage is preferably fixed according to the above definition.

Exiting of the liquid from the holes of the dropletizer plates at an angle to the axis of the reactor can be achieved, for example, by virtue of the dropletizer plates being angled along their longitudinal axis at the base thereof. In the case of a star-shaped arrangement of the channels and hence of the dropletizer plates, the effect of this is that the liquid exits from the holes at an angle relative to a plane running through the axis of the reactor. The holes through which the monomer solution is added to the reactor are preferably arranged in rows parallel to the longitudinal axis of the dropletizer plate. The angle at which the dropletizer plates are aligned relative to the horizontal corresponds here to the exit angle of the droplets from the holes to the vertical axis of the reactor. Especially in the case of use of a plurality of dropletizer plates and a star-shaped arrangement of the channels, it is advantageous when, in the event of variation in the exit angle, each dropletizer plate in a channel has a different angle which increases from the inside outward and is determined in the middle of the dropletizer plate in each case by the above definition.

As well as an angled configuration of the dropletizer plates, any other configuration in which the holes of the dropletizer plates along the longitudinal axis are lower in the middle than at the edges is also possible. This is possible, for example, when the dropletizer plate is formed in the shape of a circle segment along the longitudinal axis. It is also possible, for example, to configure the dropletizer plate such that it has, at the midpoint along the longitudinal axis, a region with a flat profile, and the lateral regions to the left and right of the flat region are angled toward the longitudinal axis or are configured in the form of an arc.

Working examples of the invention are shown in the figures and are more particularly described in the description which follows.

Figure 1:
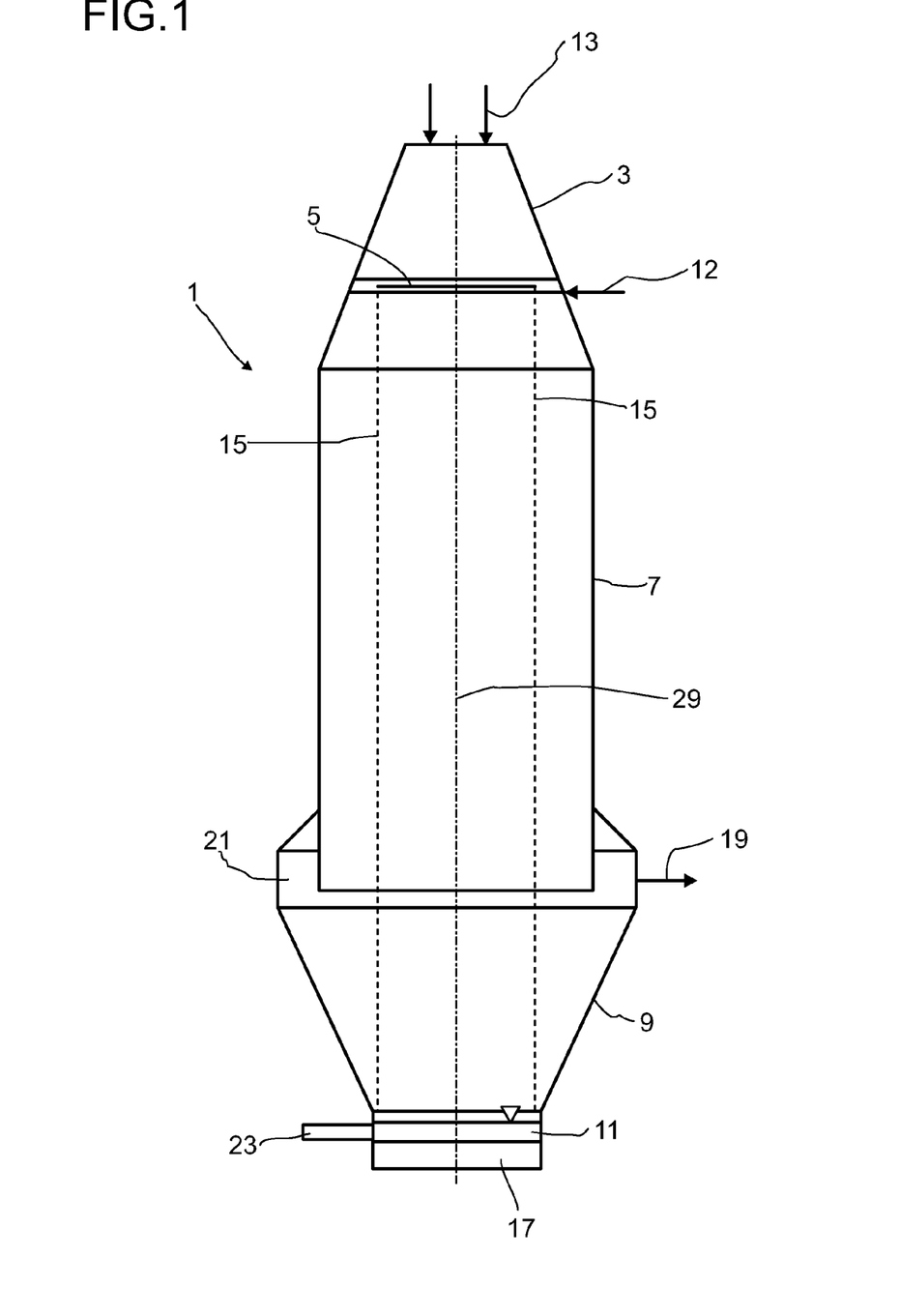
FIG. 1 a longitudinal section through a reactor for droplet polymerization.

The figures show:

FIG. 1 shows a longitudinal section through a reactor for droplet polymerization, as used with preference for production of poly(meth)acrylate particles.

A reactor 1 for droplet polymerization comprises a reactor head 3 in which there is accommodated an apparatus for dropletization 5, a middle region 7 in which the polymerization reaction proceeds, and a lower region 9 having a fluidized bed 11 in which the reaction is concluded.

For performance of the polymerization reaction to prepare the poly(meth)acrylate, the apparatus for dropletization 5 is supplied with a monomer solution via a monomer feed 12. When the apparatus for dropletization 5 has a plurality of channels, it is preferable to supply each channel with the monomer solution via a dedicated monomer feed 12. The monomer solution exits through holes, which are not shown in FIG. 1, in the apparatus for dropletization 5 and disintegrates into individual droplets which fall downward within the reactor. Through a first addition point for a gas 13 above the apparatus for dropletization 5, a gas, for example nitrogen or air, is introduced into the reactor 1. This gas flow supports the disintegration of the monomer solution exiting from the holes of the apparatus for dropletization 5 into individual droplets. In addition, the gas flow promotes lack of contact of the individual droplets and coalescence thereof to larger droplets.

In order firstly to make the cylindrical middle region 7 of the reactor very short and additionally to avoid droplets hitting the wall of the reactor 1, the reactor head 3 is preferably conical, as shown here, in which case the apparatus for dropletization 5 is within the conical reactor head 3 above the cylindrical region. Alternatively, however, it is also possible to make the reactor cylindrical in the reactor head 3 as well, with a diameter as in the middle region 7. Preference is given, however, to a conical configuration of the reactor head 3. The position of the apparatus for dropletization 5 is selected such that there is still a sufficiently large distance between the outermost holes through which the monomer solution is supplied and the wall of the reactor to prevent the droplets from hitting the wall. For this purpose, the distance should at least be in the range from 50 to 1500 mm, preferably in the range from 100 to 1250 mm and especially in the range from 200 to 750 mm. It will be appreciated that a greater distance from the wall of the reactor is also possible. This has the disadvantage, however, that a greater distance is associated with poorer exploitation of the reactor cross section.

The lower region 9 concludes with a fluidized bed 11, into which the polymer particles formed from the monomer droplets fall during the fall. In the fluidized bed, further reaction proceeds to give the desired product. According to the invention, the outermost holes through which the monomer solution is dropletized are positioned such that a droplet falling vertically downward falls into the fluidized bed 11. This can be achieved, for example, by virtue of the hydraulic diameter of the fluidized bed being at least as large as the hydraulic diameter of the area which is enclosed by a line connecting the outermost holes in the apparatus for dropletization 5, the cross-sectional area of the fluidized bed and the area formed by the line connecting the outermost holes having the same shape and the centers of the two areas being at the same position in a vertical projection of one onto the other. The outermost position of the outer holes relative to the position of the fluidized bed 11 is shown in FIG. 1 with the aid of a dotted line 15.

In order, in addition, to avoid droplets hitting the wall of the reactor in the middle region 7 as well, the hydraulic diameter at the level of the midpoint between the apparatus for dropletization and the gas withdrawal point is at least 10% greater than the hydraulic diameter of the fluidized bed.

The reactor 1 may have any desired cross-sectional shape. However, the cross section of the reactor 1 is preferably circular. In this case, the hydraulic diameter corresponds to the diameter of the reactor 1.

Above the fluidized bed 11, the diameter of the reactor 1 increases in the embodiment shown here, such that the reactor 1 widens conically from the bottom upward in the lower region 9. This has the advantage that polymer particles formed in the reactor 1 that hit the wall can slide downward into the fluidized bed 11 along the wall. To avoid caking, it is additionally possible to provide tappers, not shown here, on the outside of the conical section of the reactor, with which the wall of the reactor is set in vibration, as a result of which adhering polymer particles are detached and slide into the fluidized bed 11.

For gas supply for the operation of the fluidized bed 11, a gas distributor 17 present beneath the fluidized bed 11 blows the gas into the fluidized bed 11.

Since gas is introduced into the reactor 1 both from the top and from the bottom, it is necessary to withdraw gas from the reactor 1 at a suitable position. For this purpose, at least one gas withdrawal point 19 is disposed at the transition from the middle region 7 having constant cross section to the lower region 9 which widens conically from the bottom upward. In this case, the wall of the cylindrical middle region 7 projects into the lower region 9 which widens conically in the upward direction, the diameter of the conical lower region 9 at this position being greater than the diameter of the middle region 7. In this way, an annular chamber 21 which surrounds the wall of the middle region 7 is formed, into which the gas flows, and from which the gas can be drawn off through the at least one gas withdrawal point 19 connected to the annular chamber 21.

The further-reacted polymer particles of the fluidized bed 11 are withdrawn by a product withdrawal point 23 from the region of the fluidized bed.

Figure 2:
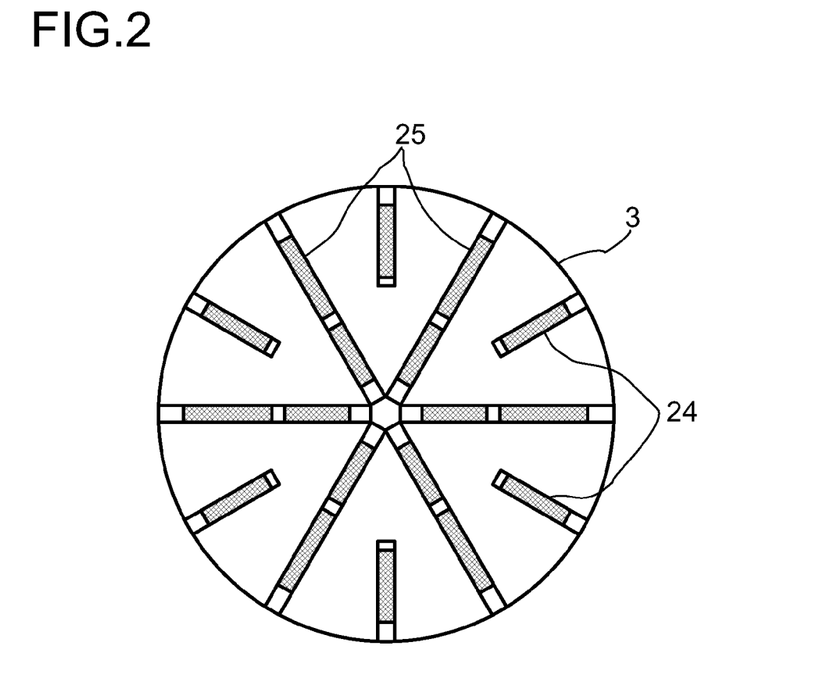
FIG. 2 an arrangement of radial dropletizer channels of different length.

FIG. 2 shows an arrangement of radial dropletizer channels of different length.

In a first embodiment, the apparatus for dropletization has radial channels 25. In this case, one portion of the channels 25 projects into the middle of the reactor 1. A further portion of the channels 24 projects less far into the reactor 1, and so, especially in the outer regions of the reactor where the distance between the radial channels 25 projecting into the middle of the reactor 1 is high, further channels 24 through which the monomer solution can be introduced into the reactor 1 are provided. This allows more homogeneous distribution of the droplets over the total reactor cross section.

In order to promote lack of impact of the droplets leaving the apparatus for dropletization with the wall of the reactor 1, the channels may be aligned in the reactor head 3 at an angle β to the horizontal. The angle β is preferably in the range from 0° to 20°, more preferably in the range from 0° to 15° and especially in the range from 0° to 5°. In this case, the channels on the side facing the wall of the reactor 3 are lower than on the side facing the center of the reactor 3.

Figure 3:
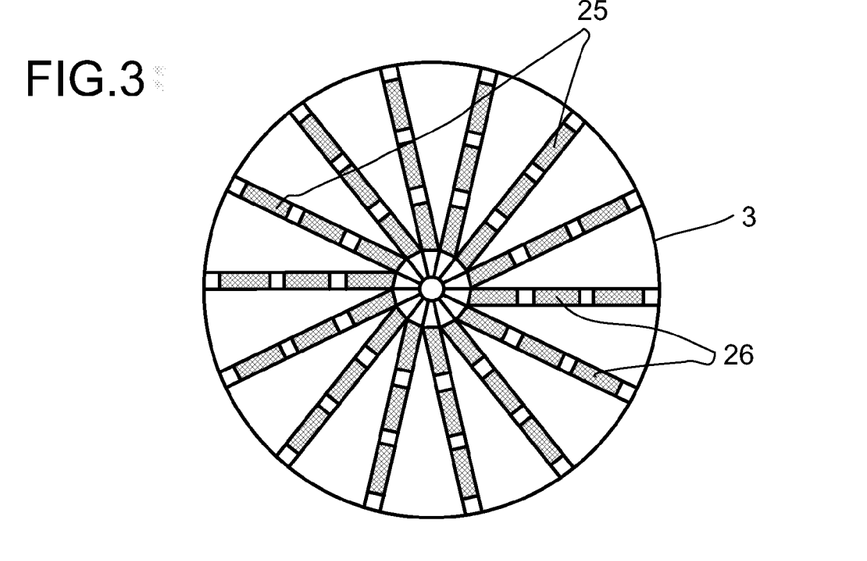
FIG. 3 an arrangement of dropletizer channels arranged in a star shape.
Figure 4:
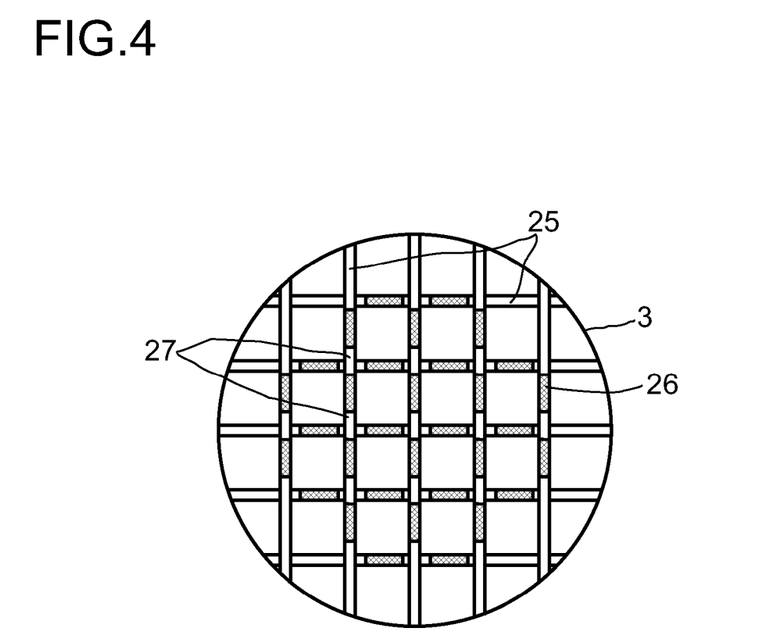
FIG. 4 an arrangement of dropletizer channels in rectangular pitch.
Figure 5:
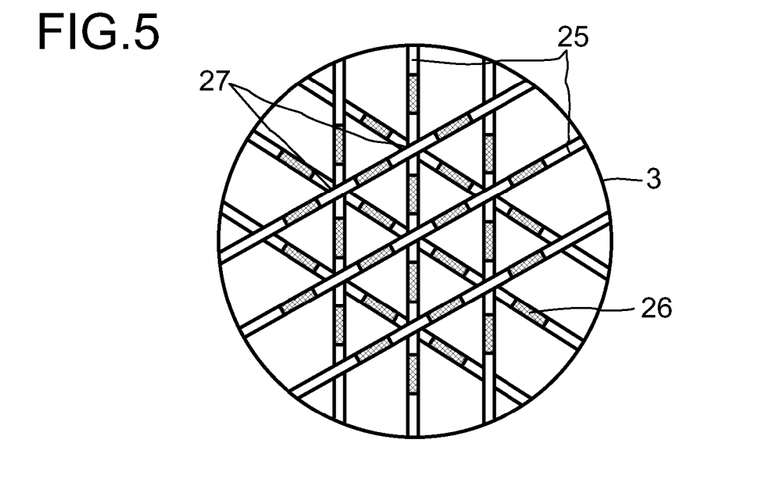
FIG. 5 an arrangement of dropletizer channels in triangular pitch.

A corresponding star-shaped arrangement of the channels 25 is shown in FIG. 3. Further possible arrangements of the channels are shown in FIGS. 4 and 5. In these, however, an arrangement with an angle β to the horizontal can be achieved only with difficulty, such that the channels 25 in this case preferably run horizontally. FIG. 4 shows an arrangement in rectangular pitch, in which the individual channels 25 are each arranged at an angle of 90° to one another, such that the points of intersection 27 of the channels each form rectangles, preferably squares.

FIG. 5 shows an arrangement in triangular pitch. The channels 25 here are each arranged at an angle of 60° relative to one another, such that the points of intersection 27 of the channels 25 each form equilateral triangles. However, this additionally requires the channels that run parallel in each case always to have an equal separation.

In order to enable the channels to be pulled out in the embodiment shown in FIGS. 4 and 5, it is necessary that the channels 25 that are not aligned parallel to one another are in different horizontal planes.

As an alternative to the embodiments shown here, it is of course also possible to arrange the channels such that the distance between channels arranged in parallel varies, or the distance between the channels arranged in parallel is equal in each case but the distances between the channels that are arranged in parallel and run in different directions are different. In addition, it is also possible to arrange the channels at any other angle relative to one another.

Especially in the case of a circular reactor cross section, however, the star-shaped arrangement shown in FIG. 3 is preferred. In this case, however, the number of channels may vary as a function of the circumference of the reactor. In addition, it is possible to configure the channels with different lengths, such that they project into the reactor 1 to different extents. However, a rotationally symmetrical arrangement is always preferred.

The position of dropletizer plates 26 which conclude the channels for supply of the monomer solution at the base thereof, and in which the holes through which the monomer solution is dropletized into the reactor are formed, is shown in FIGS. 3 to 5 by the dotted areas.

According to the invention, the number of channels 24, 25 is selected such that the ratio of the area covered by the channels 24, 25 or the dropletizer head in the reactor relative to the area which is defined by the surface within a circumferential line of the channels or the dropletizer head which connects the outermost holes is less than 50%. This ensures that sufficient gas can flow past the channels 24, 25 and adequate contact between gas and droplets leaving the channels 24, 25 is achieved.

Figure 6:
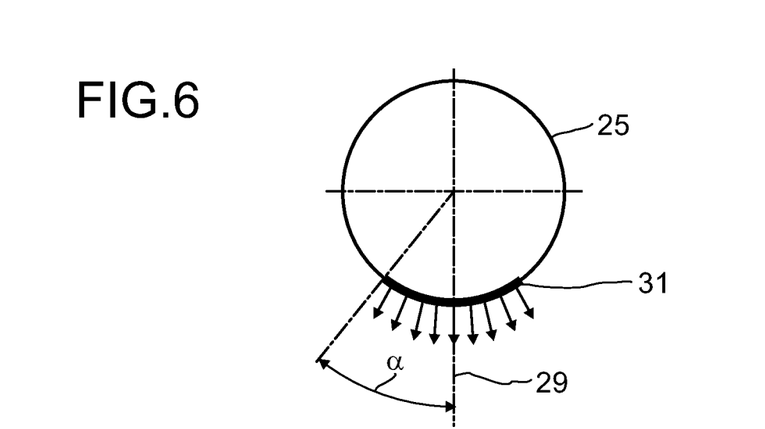
FIG. 6 a cross section through a dropletizer channel in a first embodiment.
Figure 7:
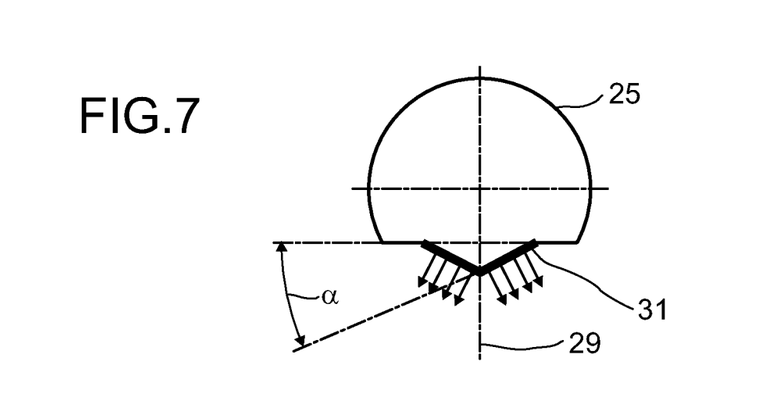
FIG. 7 a cross section through a dropletizer channel in a second embodiment.
Figure 8:
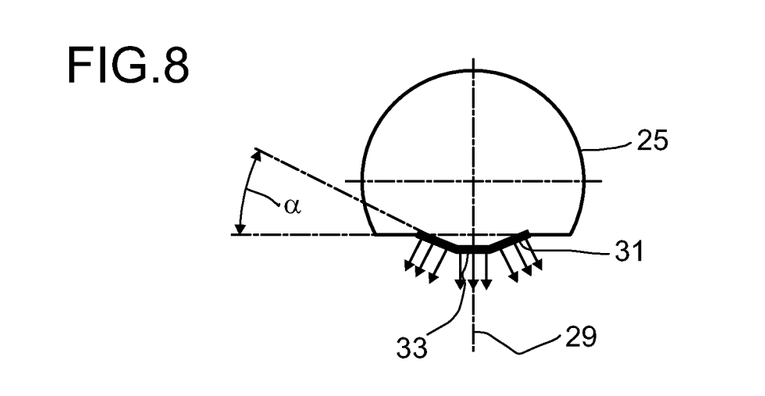
FIG. 8 a cross section through a dropletizer channel in a third embodiment.

FIGS. 6, 7 and 8 show cross sections through channels 25 in different embodiments.

In order to obtain a homogeneous droplet distribution over the reactor cross section, it is preferable when at least the droplets that are formed in a channel in the outer holes exit at an angle to the vertical, i.e. to the reactor axis. For this purpose, it is possible, for example, to configure the region of the channel in which the holes are formed, as shown in FIG. 6, in the form of a circle segment. As a result of this, the angle α at which the monomer solution exits in relation to the reactor axis 29 increases from the middle of the channel outward.

Alternatively, it is also possible, as shown in FIG. 7, to align the channel base in which the holes are formed at an angle to the horizontal, in which case, for holes at right angles to the channel base 31, the angle α at which the droplets exit relative to the reactor axis corresponds to the angle α of the channel base to the horizontal. Another possibility is a configuration in which, in addition to the angled regions of the channel base 31, a middle base region 33 runs horizontally.

In order to enable simple cleaning of the holes, it is advantageous when the holes are formed in dropletizer plates which are positioned at correspondingly configured orifices in the base of the channels 25. The dropletizer plates can then be deinstalled for cleaning and replaced by clean dropletizer plates. In this case, the dropletizer plates are preferably configured either in the form of a circle segment or in angled form, in order that a base profile of the channel 25 as shown in FIGS. 6 to 8 can be achieved.

Especially in the case of a star-shaped arrangement of the channels, it is additionally preferable when the angle at which the monomer solution exits increases from the middle of the reactor outward.

As well as the circular cross section shown here, it is also possible to configure the channels 25 with any other cross section. Especially when dropletizer plates are used, it is particularly preferable to form the channels 25 with a rectangular cross section. In this case, the channel may be sealed at the top by a removable lid, and the dropletizer plates may be removed and exchanged in a simple manner after removal of the lid.

Figure 9:
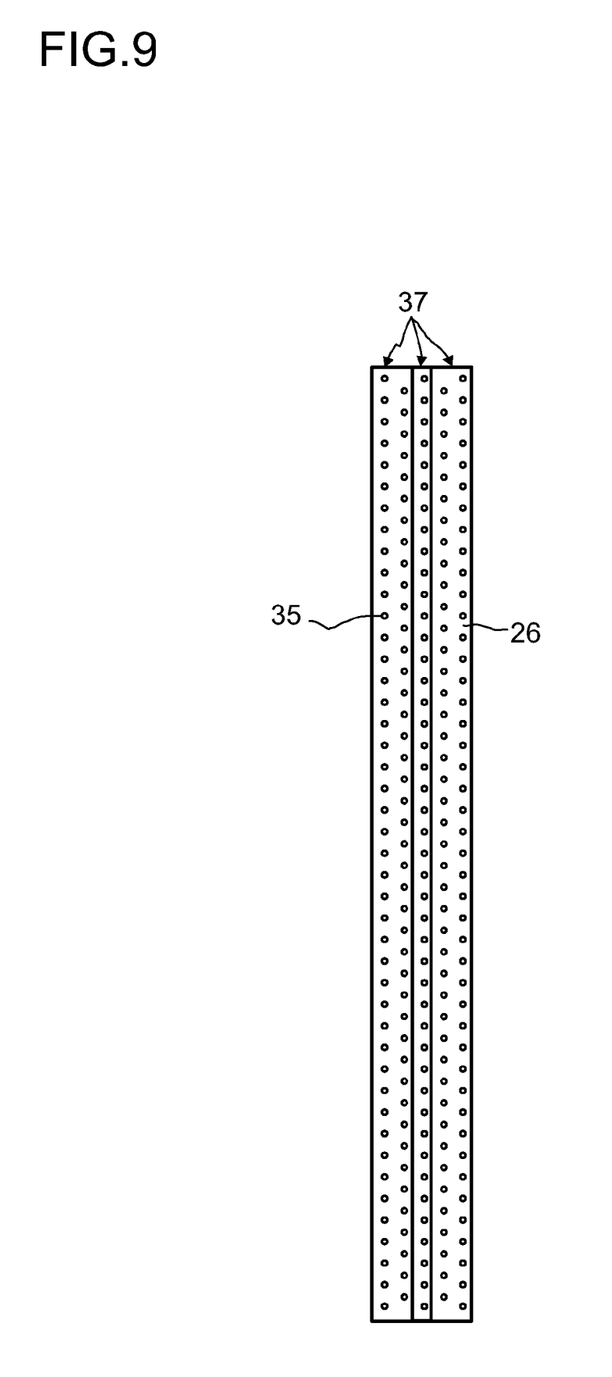
FIG. 9 a top view of a dropletizer plate.

FIG. 9 shows a top view of a dropletizer plate.

A dropletizer plate 26 has a number of holes 35 through which the monomer solution is dropletized into the reactor. The monomer solution flows through the holes 35 and, after leaving the dropletizer plate 26, disintegrates into droplets. The droplets are produced immediately after departure from the dropletizer plate 26.

According to the invention, the number of holes in the dropletizer plate relative to the area of the dropletizer plate 26 is chosen such that the number of holes relative to the area which is defined by the surface within a circumferential line of the channels or the dropletizer head which connects the outermost holes 35 of the dropletizer plate 26 is within the range from 1000 to 15 000 holes/m2, preferably within the range from 2000 to 12 000 holes/m$^2$ and especially within the range from 4000 to 10 000 holes/m$^2$. All the dropletizer plates of the apparatus for dropletization 5 in the reactor 1 are taken into account here. The appropriate number of holes 35 produces a sufficiently large amount of droplets to be able to operate the reactor economically; on the other hand, the number of droplets must not become so great that individual droplets collide and coalesce. The number of droplets therefore has to be chosen such that every droplet is surrounded by a sufficiently large gas volume with which collision with other droplets can be substantially avoided. Complete avoidance of droplet collisions and coalescence of individual droplets cannot be achieved if the reactor is still to be operated in an economically viable manner. However, substantial avoidance is achieved when the number of holes 35 in the dropletizer plate relative to the area which is defined by the surface within a circumferential line of the channels or the dropletizer head which connects the outermost holes 35 of the dropletizer plate 26 is within the range described above.

From a manufacturing point of view, it is preferable when the holes 35 for monomer addition are arranged in parallel adjacent rows of holes 37, as shown here. In order to substantially avoid collision of the droplets, a suitable distance between the holes in a row of holes and of the rows of holes from one another is in the range from 1 to 100 mm, preferably in the range from 2 to 50 mm and especially in the range from 3 to 20 mm.

LIST OF REFERENCE NUMERALS 1 reactor
3 reactor head
5 apparatus for dropletization
7 middle region
9 lower region
11 fluidized bed
12 monomer feed
13 addition point for gas
15 position of the outermost holes in relation to the fluidized bed 11

17 gas distributor
19 gas withdrawal point
21 annular chamber
23 product withdrawal point
24 channel
25 channel
26 dropletizer plate
27 point of intersection
29 reactor axis
31 channel base
33 middle region of base
35 hole for monomer addition
37 row of holes

The invention claimed is:

1. An apparatus for addition of droplets of a monomer solution for production of poly(meth)acrylate to a reactor (1) for droplet polymerization, comprising at least one channel (24, 25) or a dropletizer head having, at its base, holes (35) through which the solution is dropletized into the reactor (1), at least one of the following features (a) and (b) being fulfilled:
    (a) the ratio of the area covered by the channels (24, 25) or the dropletizer head in the reactor (1) relative to the area which is defined by the surface within a circumferential line of the channels (24, 25) or the dropletizer head which connects the outermost holes is less than 50%,
    (b) the number of holes (35) relative to the area which is defined by the circumference of a line along the outermost holes is within a range from 100 to 1000 holes/m$^2$, and wherein the dropletizer head is or the dropletizer plates (26) are configured such that the holes are aligned such that the liquid exits from the holes (35) at an angle to the axis of the reactor.

2. The apparatus according to claim 1, wherein the channels (24, 25) are sealed at their base by dropletizer plates (26) in which the holes (35) for dropletization of the solution are accommodated.

3. The apparatus according to claim 1, wherein the channels (25) are arranged in a star shape in the reactor.

4. The apparatus according to claim 1, wherein the channels (24, 25) are arranged in a rotationally symmetric manner about the center of the reactor (1), the channels each projecting into the reactor (1) to different extents from the outer wall in the direction of the center of the reactor (1).

5. The apparatus according to claim 1, wherein a plurality of parallel channels (25) in each case are aligned transverse to one another.

6. The apparatus according to claim 1, wherein at least one annular channel is included.

7. The apparatus according to claim 1, wherein the dropletizer head has a circular or homogeneous polygonal cross section.

8. The apparatus according to claim 1, wherein the holes (35) have a diameter in the range from 25 to 500 μm.

9. The apparatus according to claim 1, wherein the holes (35) have a distance from one another in the range from 1 to 100 mm.

10. The apparatus according to claim 1, wherein the number of holes relative to the area of the dropletizers is in the range from 1000 to 15 000 holes/m$^2$.

* * * * *